US010602062B1

(12) United States Patent
Jung

(10) Patent No.: US 10,602,062 B1
(45) Date of Patent: Mar. 24, 2020

(54) SYSTEM AND METHOD FOR GENERATING 360° VIDEO INCLUDING ADVERTISEMENT

(71) Applicant: 3i Corporation, Daegu (KR)

(72) Inventor: Ji Wuck Jung, Daegu (KR)

(73) Assignee: 3i Corporation, Daegu (KR)

(*) Notice: Subject to any disclaimer, the term of this patent is extended or adjusted under 35 U.S.C. 154(b) by 0 days.

(21) Appl. No.: 16/227,521

(22) Filed: Dec. 20, 2018

(51) Int. Cl.
| | | |
|---|---|---|
| *G11B 27/036* | (2006.01) | |
| *H04N 5/272* | (2006.01) | |
| *H04N 21/81* | (2011.01) | |
| *H04N 5/232* | (2006.01) | |
| *G06Q 30/02* | (2012.01) | |

(52) U.S. Cl.
CPC ..... *H04N 5/23238* (2013.01); *G06Q 30/0276* (2013.01); *G11B 27/036* (2013.01); *H04N 5/23299* (2018.08); *H04N 5/272* (2013.01)

(58) Field of Classification Search
CPC .......... H04N 5/23238; H04N 5/23299; H04N 5/272; G06Q 30/0276; G11B 27/036
See application file for complete search history.

(56) References Cited

U.S. PATENT DOCUMENTS

| 10,334,165 | B2* | 6/2019 | Anderson | H04N 5/23222 |
|---|---|---|---|---|
| 2011/0307332 | A1* | 12/2011 | Kim | G06Q 30/02 |
| | | | | 705/14.49 |
| 2015/0178777 | A1* | 6/2015 | Jing | G06Q 30/0259 |
| | | | | 705/14.57 |
| 2017/0171639 | A1* | 6/2017 | Bai | H04N 21/23424 |

FOREIGN PATENT DOCUMENTS

| KR | 10-1725024 | | 4/2017 |
|---|---|---|---|
| KR | 20190038134 A | * | 4/2019 |
| KR | 20190061165 A | * | 6/2019 |

* cited by examiner

*Primary Examiner* — Tsion B Owens
(74) *Attorney, Agent, or Firm* — H.C. Park & Associates, PLC

(57) ABSTRACT

A system and method capable of generating a 360° video including advertising content by photographing only a video for a specific direction not an omni-direction covered by a 360° video. Devices and methods are capable of generating a 360° video using relatively small resources. In particular, embodiments provide a system and method capable of generating a 360° video conveniently and relatively accurately using a terminal carried by a user. Furthermore, embodiment provide a system and method capable of generating a 360° video by photographing only a video for a specific direction not an omni-directional view covered by a 360° video. Furthermore, embodiments provide advertising content in a 360° video.

18 Claims, 11 Drawing Sheets

SYSTEM AND METHOD FOR GENERATING 360° VIDEO INCLUDING ADVERTISEMENT

BACKGROUND

Field

Exemplary implementations of the invention relate generally to a system and method for generating a 360° video and, more particularly, to a system and method capable of generating a 360° video including advertising content by photographing only a video for a specific direction not an omni-direction covered by a 360° video.

Discussion of the Background

Many attempts have been made to generate a merged image and provide a virtual reality (VR) or a realistic simulation environment.

For example, a panorama image relates to an image in which a viewing angle in width can cover 180° to 360° by combining a plurality of images horizontally (i.e., left and right). In contrast, a 360° image may mean an image in which all of up, down, left and right sides around a user or a specific location can be covered. In general, a 360° image may be obtained through a process of connecting and attaching multiple images, captured while a scene or the interior is rotated, through given processing and positioning them in a spherical shape, a cylindrical shape, or a mercator.

Unlike the existing video that is fixed when a photographer selects the video, a 360° video may cover all of up, down, left and right sides around a user or a specific location and is implemented so that a user can select a desired direction or point while the video is played back.

In general, a 360° video is generated through a process of synchronizing time lines between moving images captured by a plurality of cameras and stitching neighboring moving images or generated in such a way as to generate each of video frame images forming the 360° video by stitching images captured by a plurality of cameras.

Such a conventional 360° video generation technology requires dedicated equipment having great computing power and a long generation time because it requires very many resources.

The above information disclosed in this Background section is only for understanding of the background of the inventive concepts, and, therefore, it may contain information that does not constitute prior art.

SUMMARY

Devices constructed and methods according to exemplary implementations of the invention are capable of providing a system and method capable of generating a 360° video using relatively small resources. In particular, an exemplary embodiment provides a system and method capable of generating a 360° video conveniently and relatively accurately using a terminal carried by a user. Furthermore, an exemplary embodiment provides a system and method capable of generating a 360° video by photographing only a video for a specific direction not an omni-directional view covered by a 360° video. Furthermore, an exemplary embodiment provides inventive concepts capable of including advertising content in a 360° video.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

According to one or more embodiments of the invention, a method of generating a 360° video, the method including: obtaining, by a 360° video generation system, partial images including a first partial image to an N-th partial image (N is an integer of 2 or more) by photographing toward a first photographing direction to an N-th photographing direction, respectively, at a given photographing location, wherein each of the first photographing direction to the N-th photographing direction are directions different from each other; generating, by the 360° video generation system, advertising images respectively corresponding to target replacement images by modifying the target replacement images, the target replacement images including at least some of the first partial image to the N-th partial image; generating, by the 360° video generation system, a 360° image by merging the advertising images respectively corresponding to the target replacement images with the partial images other than the target replacement images among the first partial image to the N-th partial image; obtaining, by the 360° video generation system, a plurality of video frame images photographed toward a target direction being one of the first photographing direction to N-th photographing direction; and generating, by the 360° video generation system, a 360° video based on the plurality of video frame images and the 360° image.

The target replacement image may include at least one of a left-neighboring image and a right-neighboring image. The left-neighboring image may be a partial image neighboring the left side of a partial image which has been photographed toward the target direction. The right-neighboring image may be a partial image neighboring the right side of a partial image which has been photographed toward the target direction.

The generating of the advertising images may include: detecting, by the 360° video generation system, a target object in the target replacement image; and replacing, by the 360° video generation system, the detected target object with a given advertising object corresponding to the detected target object.

The generating of the advertising images may include: replacing, by the 360° video generation system, some region of the target replacement image with a given advertising image.

The replacing of the some region of the target replacement image with a given advertising image may include: detecting, by the 360° video generation system, a given non-importance region within the target replacement image, the non-importance region being a region having: a size equal to or greater than a given size; and a color difference between each of pixels within the non-importance region within a certain value; and inserting, by the 360° video generation system, the advertising image into the non-importance region within the target replacement image.

The obtaining of the first partial image to the N-th partial image may include: obtaining, by the 360° video generation system, the first partial image to the N-th partial image captured by a terminal equipped with an image sensor. The terminal may be configured to obtain the first partial image by capturing the first partial image toward the first photographing direction at the photographing location, and may sequentially rotate and capture the second partial image to the N-th partial image by controlling a driving device combined with the terminal to rotate the terminal. the terminal may be configured to control the driving device to rotate the terminal directed toward a (j−1)-th photographing direction and direct the terminal toward a j-th photographing direction after capturing a (j−1)-th partial image, and obtain a j-th partial image by capturing the j-th partial image toward the j-th photographing direction, and wherein j is a natural number, where 2<=j<=N The obtaining of the first partial image to the N-th partial image may include: obtaining, by the 360° video generation system, the first partial image to the N-th partial image captured by a terminal equipped with an image sensor. The method may further include: obtaining, by the 360° video generation system, a first additional partial image to an N-th additional partial image additionally captured by the terminal, photographed toward the first photographing direction to the N-th photographing direction, respectively, at the photographing location; and specifying, by the 360° video generation system, the target direction by comparing each of the partial images with corresponding additional partial images.

The method may further include: determining a target direction, the target direction being a photographing direction, corresponding to a partial image obtained by photographing a predetermined specific object.

According to one or more embodiments of the invention, a non-transitory computer-readable storage medium having stored thereon processor-executable instruction configured to cause a processor to perform the above-described method.

According to one or more embodiments of the invention, a 360° video generation system includes: a processor; and memory configured to store a computer program executed by the processor, wherein the computer program comprises instructions, when executed by the processor, configured to cause the 360° video generation system to perform the above-described method.

According to one or more embodiments of the invention, a 360° video generation system includes: an image acquisition module configured to obtain partial images comprising a first partial image to an N-th partial image (N is an integer of 2 or more) by photographing toward a first photographing direction to an N-th photographing direction, respectively, at a given photographing location, wherein each of the first photographing direction to the N-th photographing direction are directions different from each other; an advertising image generation module configured to generate advertising images respectively corresponding to target replacement images by modifying the target replacement images, the target replacement images comprising at least some of the first partial image to the N-th partial image; a 360° image generation module configured to generate a 360° image by merging the advertising images respectively corresponding to the target replacement images with the partial images other than the target replacement images among the first partial image to the N-th partial image; a video frame acquisition module configured to obtain a plurality of video frame images photographed toward a target direction being one of the first photographing direction to N-th photographing direction; and a video generation module configured to generate a 360° video based on the plurality of video frame images and the 360° image.

The target replacement image may include at least one of a left-neighboring image and a right-neighboring image. The left-neighboring image may be a partial image neighboring the left side of a partial image which has been photographed toward the target direction. The right-neighboring image may be a partial image neighboring the right side of a partial image which has been photographed toward the target direction.

The advertising image generation module may be configured to: detect a target object in the target replacement image; and replace the detected target object with a given advertising object corresponding to the detected target object.

The advertising image generation module may be configured to replace some region of the target replacement image with a given advertising image.

The advertising image generation module may be configured to detect a given non-importance region within the target replacement image, the non-importance region being a region having a size equal to or greater than a given size; and a color difference between each of pixels within the non-importance region within a certain value; and insert the advertising image into the non-importance region within the target replacement image.

The image acquisition module may be configured to obtain the first partial image to the N-th partial image captured by a terminal equipped with an image sensor. The terminal may be configured to obtain the first partial image by capturing the first partial image toward the first photographing direction at the photographing location, and sequentially rotate and capture the second partial image to the N-th partial image by controlling a driving device combined with the terminal to rotate the terminal. The terminal may be configured to control the driving device to rotate the terminal directed toward a (j−1)-th photographing direction and direct the terminal toward a j-th photographing direction after capturing a (j−1)-th partial image, and may obtains a j-th partial image by capturing the j-th partial image toward the j-th photographing direction, and wherein j is as natural number, where 2<=j<=N.

The image acquisition module may be configured to: obtain the first partial image to the N-th partial image captured by a terminal equipped with an image sensor; and further obtain additional partial images comprising a first additional partial image to an N-th additional partial image additionally captured by the terminal photographed toward the first photographing direction to the N-th photographing direction, respectively, at the photographing location. The 360° video generation system may further include a specifying module configured to specify the target direction by comparing each of the partial images with corresponding additional partial images.

The 360° video generation system may further include a specifying module configured to determine a target direction, the target direction being a photographing direction, corresponding to a partial image obtained by photographing a predetermined specific object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
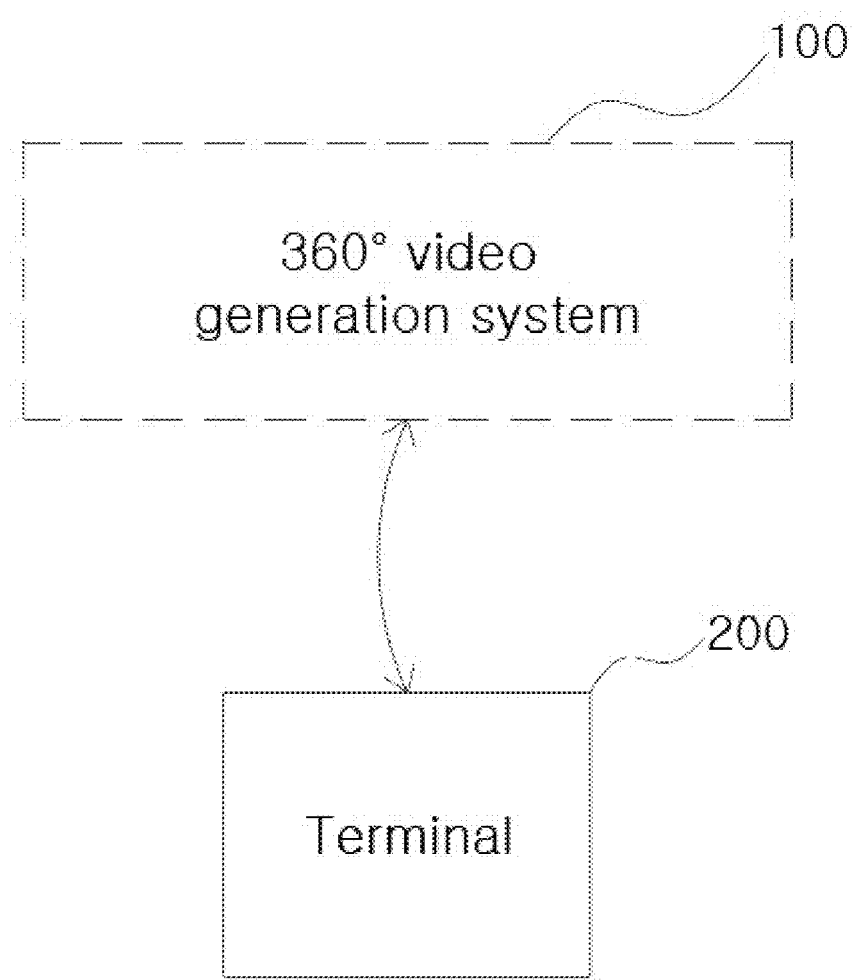
FIG. 1A and FIG. 1B are schematic diagrams that illustrate an operating environment of a 360° video generation system according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Furthermore, in this specification, if one element "transmit" data to the other element, this means that one element may directly transmit the data to the other element or may transmit the data to the other element through at least another element. In contrast, if one element "directly transmit" data to the other element, this means that the data is transmitted from one element to the other element without the intervention of another element.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the present invention is described in detail based on embodiments with reference to the accompanying drawings. The same reference numerals described in drawings refer to the same elements.

Figure 1B:
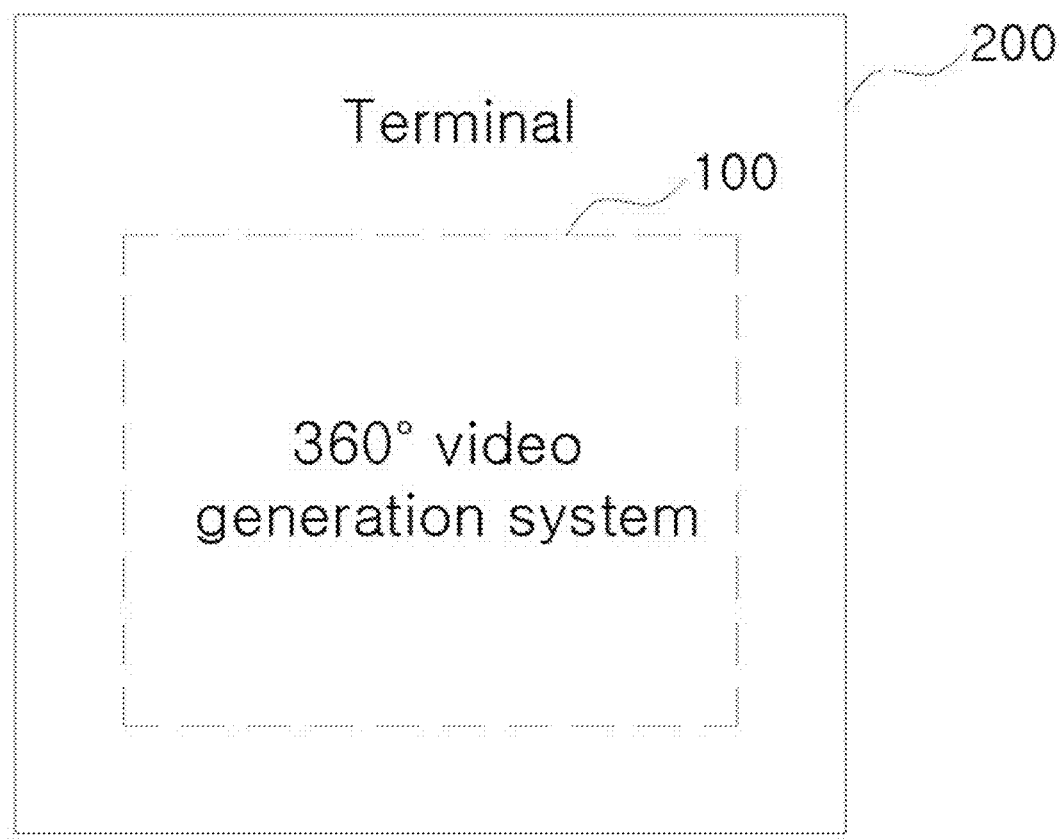

FIGS. 1A and 1B are schematic diagrams for illustrating an operating environment of a 360° video generation system 100 according to an exemplary embodiment. In order to implement a method of generating a 360° video according to the inventive concepts, a 360° video generation system 100 may be provided. The 360° video generation system 100 may generate a 360° video.

As shown in FIG. 1A, the 360° video generation system 100 is connected to a terminal 200 through wired and/or wireless communication, and may transmit and receive various data, information and/or signals necessary to implement the inventive concepts. For example, the 360° video generation system 100 may receive an image and/or video data photographed by the terminal 200, and may transmit 360° video data, generated by the 360° video generation system 100, to the terminal 200. In the exemplary embodiment of FIG. 1A, the 360° video generation system 100 may have a form of a server.

As shown in FIG. 1B, the 360° video generation system 100 may be implemented in a form included in the terminal 200. In an implementation example, the 360° video generation system 100 may be a kind of subsystem implemented by hardware configuring the terminal 200 and/or software installed in the terminal 200.

The terminal 200 may include all types of data processing devices including image sensors capable of obtaining an image. The image sensor may mean a device capable of capturing/obtaining an image.

The terminal 200 may be any data processing device if the device can process calculation or data or can receive and process input data, can store corresponding information and can output results by processing the information. For example, the terminal 200 may be a data processing device, which may be called a general-purpose computer, a personal computer, server, a mobile terminal, a portable terminal, a remote station, a remote terminal, an access terminal, a terminal, a communication device, a communication terminal, a user agent, a user device, a user equipment (UE), a terminal, a notebook, a table PC or a smartphone.

The inventive concepts are not limited to the exemplary embodiment of FIG. 1A or 1B. In some exemplary embodiments, unlike in FIGS. 1A and 1B, the 360° video generation system 100 may be implemented in the form of an independent device not a form in which the system is connected to the terminal 200 over a network or included in the terminal 200.

Figure 2:
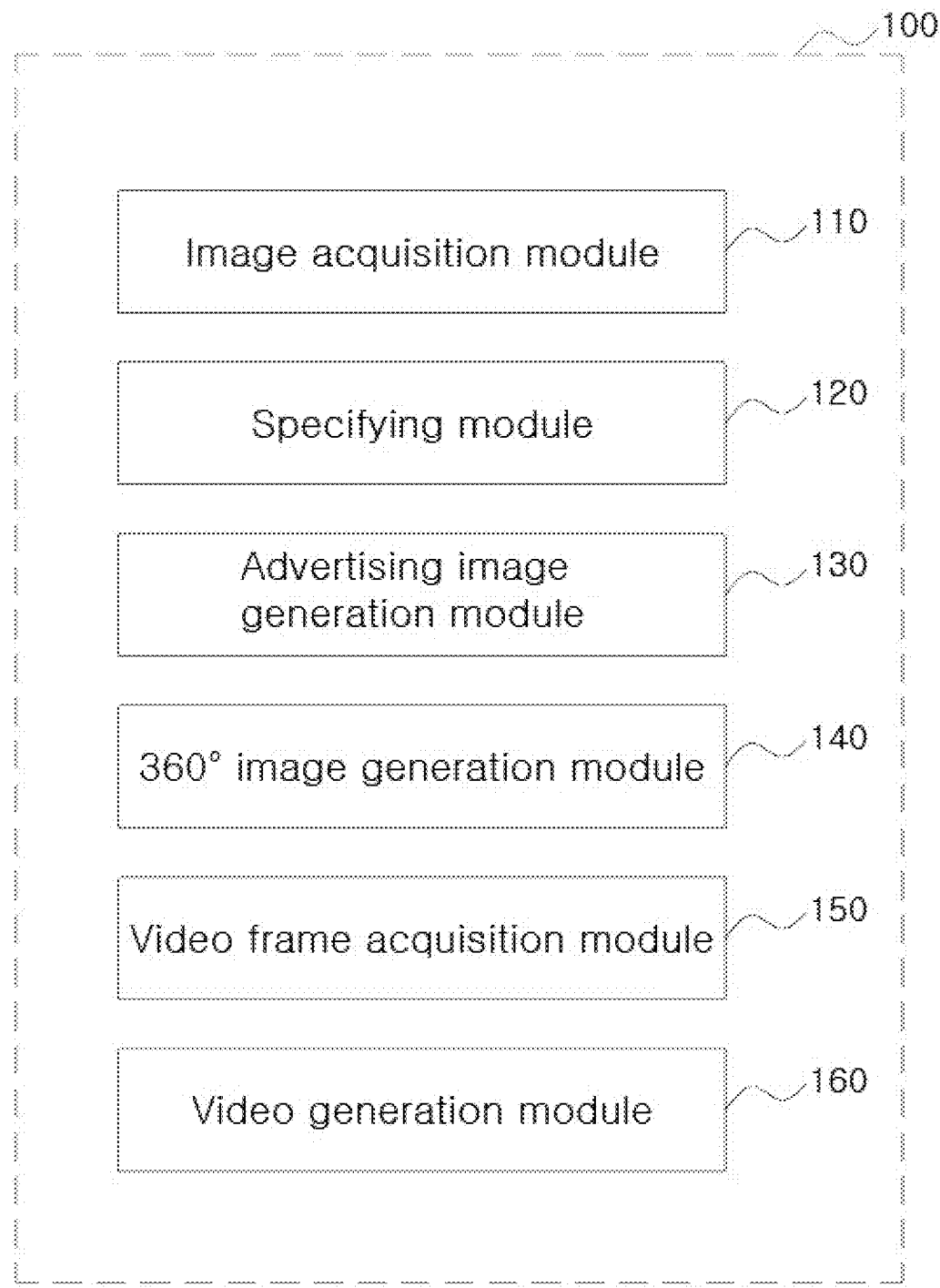
FIG. 2 is a block diagram schematically showing the configuration of the 360° video generation system according to an exemplary embodiment.

FIG. 2 is a block diagram schematically showing the configuration of the 360° video generation system 100 according to an exemplary embodiment.

As shown in FIG. 2, the 360° video generation system 100 may include an image acquisition module 110, an advertising image generation module 130, a 360° image generation module 140, a video frame acquisition module 150 and a video generation module 160. In some exemplary embodiments, the 360° video generation system 100 may further include a specifying module 120. In some exemplary embodiments, some of the elements of FIG. 2 may be omitted. Furthermore, in some exemplary embodiments, the 360° video generation system 100 may include elements more or less than the illustrated elements. For example, the 360° video generation system 100 may further include a control module capable of controlling the functions and/or resources of other elements (e.g., the image acquisition module 110, the specifying module 120, the advertising image generation module 130, the 360° image generation module 140, the video frame acquisition module 150 and/or the video generation module 160) included in the 360° video generation system 100.

The 360° video generation system 100 may include hardware resources and/or software necessary to implement the inventive concepts, and does not essentially mean a single physical element or a single device. That is, the 360° video generation system 100 may mean a logical combination of hardware and/or software provided to implement the inventive concepts. In some exemplary embodiments, the 360° video generation system 100 may be implemented as a set of logical elements installed in isolated devices to implement the inventive concepts by performing respective functions. Furthermore, the 360° video generation system 100 may mean a set of elements separately implemented for each function or role for implementing the inventive concepts. For example, the image acquisition module 110, the specifying module 120, the advertising image generation module 130, the 360° image generation module 140, the video frame acquisition module 150 and/or the video generation module 160 may be disposed in different physical devices or may be disposed in the same physical device. Furthermore, in some implementations, software and/or hardware configuring modules, such as the image acquisition module 110, the specifying module 120, the advertising image generation module 130, the 360° image generation module 140, the video frame acquisition module 150 and/or the video generation module 160, may be disposed in different physical devices. The elements disposed in the different physical devices may be organically combined to realize functions in which the respective modules are performed.

Furthermore, in this specification, a "module" may mean a functional, structural combination of hardware for performing the inventive concepts and software for driving the hardware. For example, the module may mean a logical unit of a given code and hardware resources in which the given code is executed, and those skilled in the art may easily reason that the module does not essentially mean physically connected codes or one kind of hardware.

The image acquisition module 110 may obtain a first partial image to an N-th partial image to be merged (N is an integer of 2 or more). The 360° image generation module 140 may generate a 360° image by merging the first partial image to the N-th partial image.

Each of the first partial image to N-th partial image may be an image photographed at a given photographing location. Furthermore, the first partial image to the N-th partial image may have different photographing directions.

That is, each of the first partial image to the N-th partial image may be an image photographed toward a corresponding photographing direction. The first photographing direction to the N-th photographing direction may have different directions.

In other words, the i-th partial image (i is any natural number, wherein 1<=i<=N) is an image photographed toward the i-th photographing direction corresponding to the i-th partial image at a given photographing location. The first photographing direction to the N-th photographing direction may be different directions.

The first partial image to the N-th partial image may be images captured by the terminal 200 equipped with an image sensor.

Figure 3:
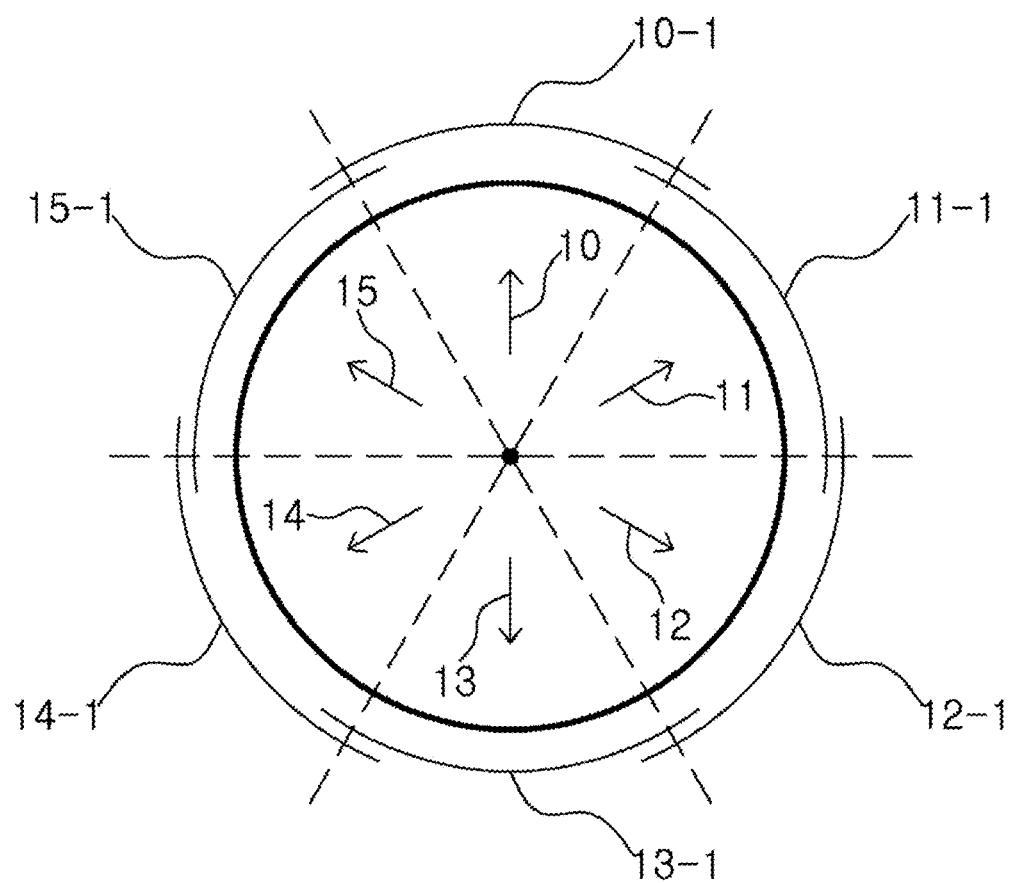
FIG. 3 illustrates an example of partial images photographed in respective photographing directions.

FIG. 3 is a diagram for illustrates an example of partial images photographed in respective photographing directions. An example of a case where a photographing device (e.g., the terminal 200) captures different 6 partial images while rotating 360° at intervals of 60° is described with reference to FIG. 3.

As shown in FIG. 3, a first partial image 10-1 may be an image photographed toward a first photographing direction 10. A second partial image 11-1 may be an image photographed toward a second photographing direction 11 rotated 60° from the first photographing direction 10. A third partial image 12-1 may be an image photographed toward a third photographing direction 12 rotated 60° from the second photographing direction 11. A fourth partial image 13-1 may be an image photographed toward a fourth photographing direction 13 rotated 60° from the second photographing direction 12. A fifth partial image 14-1 may be an image photographed toward a fifth photographing direction 14 rotated 60° from the fourth photographing direction 13. A sixth partial image 15-1 may be an image photographed toward a sixth photographing direction 15 rotated 60° from the fifth photographing direction 14.

Referring back to FIG. 2, the image acquisition module 110 may obtain the first partial image to the N-th partial image captured by the terminal 200. In a structure, such as FIG. 1A, the 360° video generation system 100 may receive the first partial image to the N-th partial image from the terminal 200 over a network. In a structure, such as FIG. 1B, when the terminal 200 photographs the first partial image to the N-th partial image and stores them in storage device within the terminal 200, the image acquisition module 110 may obtain the first partial image to the N-th partial image from the storage device.

Figure 4:
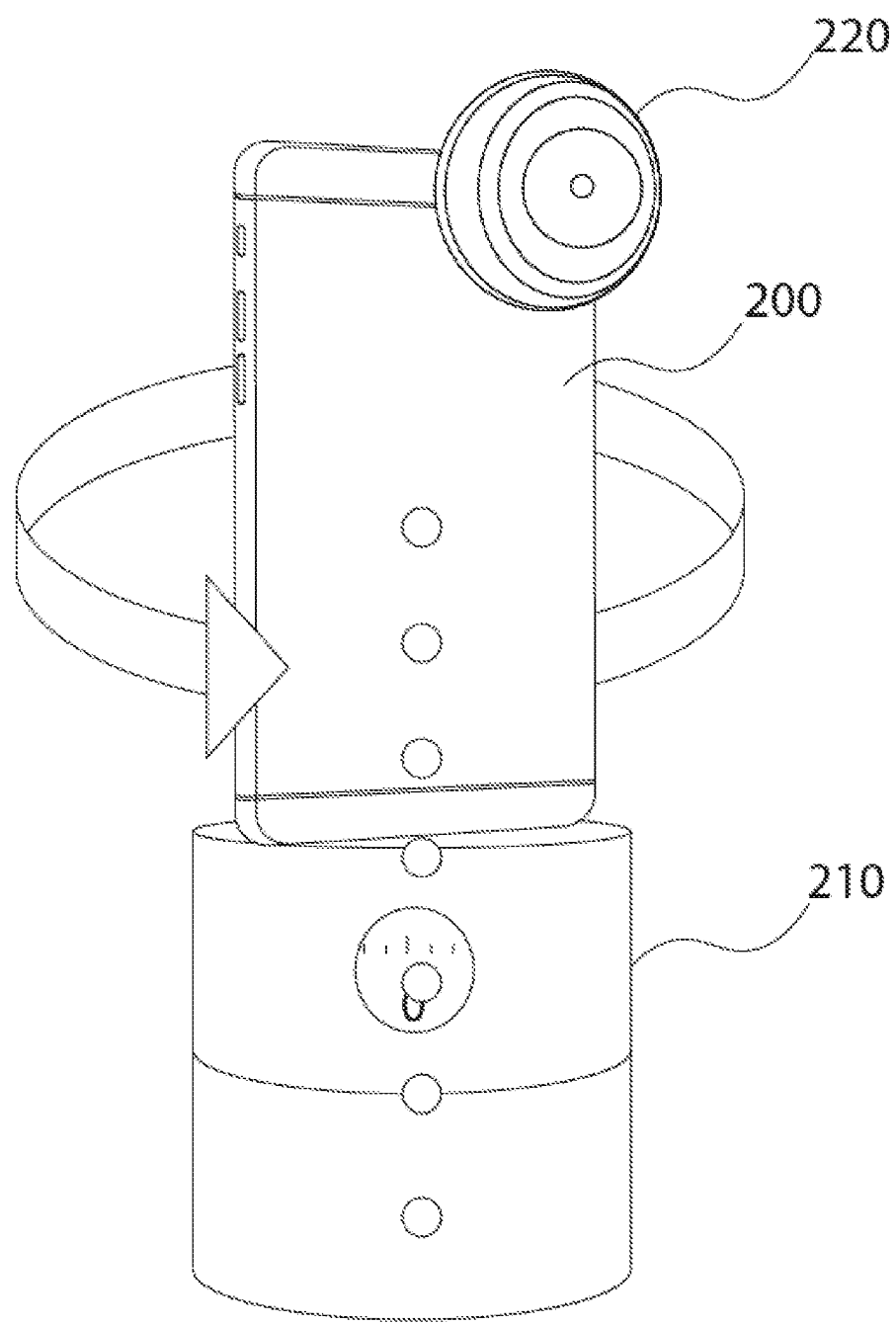
FIG. 4 shows a terminal and attached devices for capturing partial images according to an exemplary embodiment.

FIG. 4 shows a terminal and attached devices for capturing partial images to be merged according to an exemplary embodiment.

The terminal 200 may mean all types of data processing devices, which may be carried by a user and include image sensors capable of obtaining an image. For example, the terminal 200 may be a user's mobile phone, but is not limited thereto. Furthermore, some of the inventive concepts may be implemented by a device not carried by a user. This may also be included in the range of right.

The terminal 200 may capture images (i.e., partial images) while rotating. The terminal 200 may rotate 360 degrees around the terminal 200 or may not rotate 360 degrees. In any case, the terminal 200 may perform rotation as needed in such a way as to cover all angles (e.g., 360 degrees, 270 degrees or 180 degrees) to be covered by a merged image that will be generated. The degree of rotation may be different depending on the viewing angle of an image sensor included in the terminal 200.

The terminal 200 may be attached (or coupled or combined) to a given driving device 210 for rotating the terminal 200. Furthermore, a movement of the terminal 200 may be performed through the driving device 210.

The terminal 200 may control the driving device 210. For example, the terminal 200 may perform given short-distance wireless communication (e.g., Bluetooth, NFC, Zigbee communication, Wi-Fi) with the driving device 210. The terminal 200 may transmit a given command to the driving device 210. The driving device 210 may be driven in response to the given command. Furthermore, in some exemplary embodiments, the driving device 210 may transmit the results of the driving, performed in response to the command, to the terminal 200.

The driving device 210 may be a device performing at least a rotation movement. A rotator for such a rotation movement may be provided in the driving device 210. Furthermore, the driving device 210 may include a given coupler for coupling the terminal 200.

For example, the driving device 210 may be a device capable of performing rotation in a predetermined reference angle unit. The driving device 210 may be rotated at an angle required in a command in response to the command received from the terminal 200. The rotation angle of the driving device 210 and/or the terminal 200 may be controlled through such a method.

In accordance with another exemplary embodiment, the driving device 210 may perform rotation in response to a command received from the terminal 200. Furthermore, when the terminal 200 senses the rotation degree of the driving device 210 (i.e., the terminal 200) and determines that the driving device 210 has been rotated at a required angle, it may transmit a command to stop the rotation of the driving device 210. In any case, the terminal 200 may control its own rotation angle relatively precisely by controlling the rotation angle of the driving device 210.

In this specification, an example in which the driving device 210 has only a function of simply rotating the terminal 200 is described. However, in some exemplary embodiments, the driving device 210 may be implemented to perform a movement, the tilt of the terminal 200 or a function of changing the location of the terminal 200 up and down.

A given viewing angle expansion device 220 (e.g., fisheye lens) for expanding a viewing angle in a specific direction (e.g., up and down direction) may be attached to the terminal 200. In such a case, a viewing angle of up to almost 180° up and down can be secured by the viewing angle expansion device. In such a case, if the terminal 200 performs rotation to secure a viewing angle of 360° left and right, it may generate a 360° image (i.e., spherical image).

As a result, the terminal 200 according to the inventive concepts may rotate at a desired angle (i.e., rotate toward a required direction) relatively precisely by controlling the driving device 210, may capture an image, may perform rotation at a desired angle, and may then capture an image. If such control of a rotation angle is performed relatively precisely by the terminal 200, the terminal 200 and the 360° video generation system 100 may be precisely aware of a rotation angle (or viewing angle) of a neighboring image. In such a case, there is an effect in that accuracy and rapidness of image merging (or stitching) can be improved.

Figure 5:
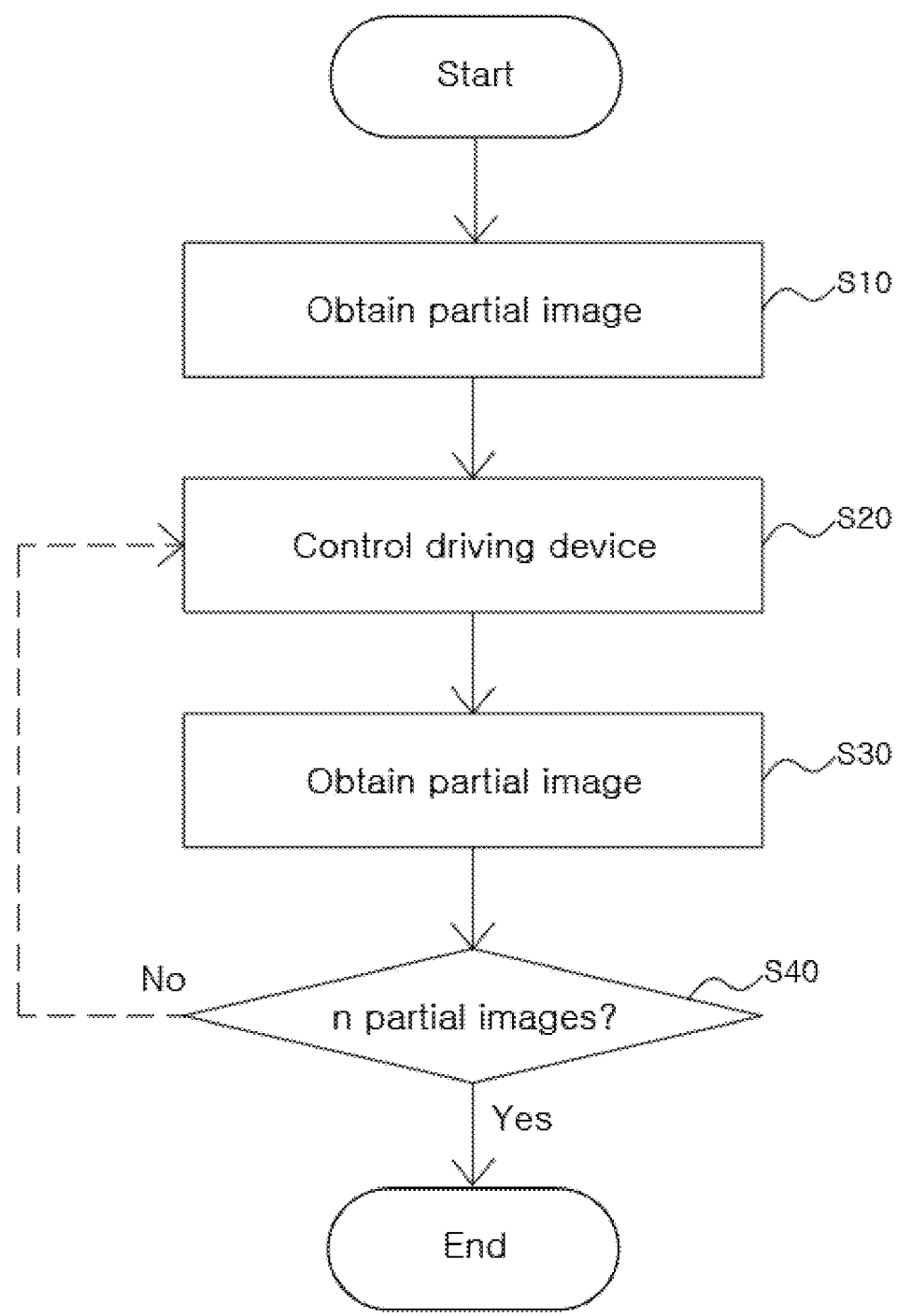
FIG. 5 is a flow chart showing a process of capturing partial images using the terminal of FIG. 4.

FIG. 5 is a brief flowchart showing a process of capturing partial images using the terminal 200 of FIG. 4.

Referring to FIG. 5, the terminal 200 may obtain a partial image in a given direction (S10). Furthermore, the terminal 200 may be rotated at a predetermined angle by controlling the driving device 210 (S20). Furthermore, the terminal 200 may obtain a corresponding partial image in the state in which the terminal has been rotated (S30). Furthermore, the terminal 200 may determine whether it has obtained n partial images corresponds to required n directions (S40). If it is determined that all the n partial images have not been obtained (S40), the terminal 200 may perform rotation by controlling the driving device again and obtain a partial image (S20 and S30).

A process for the terminal 200 of FIG. 4 to capture partial images, such as those shown in FIG. 3, is described below as an example.

The terminal 200 may capture N (e.g., 6) partial images (e.g., 10-1, 11-1, 12-1, 13-1, 14-1, and 15-1) in order to generate a merged image. To this end, the terminal 200 may rotate toward N photographing directions (e.g., 10, 11, 12, 13, 14, and 15) by controlling the driving device 210, and may capture the N partial images in the respective photographing directions.

For example, the terminal 200 may capture the first partial image 10-1 in the first photographing direction 10 and control the driving device 210 so that it is directed toward the second photographing direction. Furthermore, the terminal 200 may capture the second partial image 11-1 in the second photographing direction 11. In this way, the terminal 200 may sequentially capture the 6 partial images 10-1, 11-1, 12-1, 13-1, 14-1, and 15-1. In such a case, the image sensor of the terminal 200 may have a viewing angle greater than left and right 360°/N (60° in the example of FIG. 3).

The terminal 200 may be aware of neighboring partial images because it can sequentially obtain the partial images (e.g., 10-1, 11-1, 12-1, 13-1, 14-1, and 15-1) through rotation and photographing. Furthermore, the 360° video generation system 100 may easily determine a region relatively overlapped between partial images based on such information because it is precisely aware of the direction of each partial image. Accordingly, image merging can be performed within a relatively shorter time.

In order to perform rotation, the terminal 200 may transmit a command that instructs the driving device 210 to be rotated at a predetermined angle (e.g., 60°). Furthermore, when a signal indicating that the driving device 210 has been rotated at the predetermined angle in response to the command is received from the driving device 210, the terminal 200 may capture a partial image.

In accordance with another exemplary embodiment, the terminal 200 may output a command to rotate the driving device 210 to the driving device 210. When the driving device 210 performs rotation in response to the command, the terminal 200 may sense a rotation angle. Furthermore, when the rotation angle corresponds to a required angle, the terminal 200 may output a command for rotation stop to the driving device 210. In response thereto, the driving device 210 may stop the rotation. Accordingly, the terminal 200 may capture a partial image.

In any method, the terminal 200 may perform rotation at a desired angle and capture a partial image at the rotated angle (direction).

Referring back to FIG. 2, the image acquisition module 110 may obtain a first partial image to an N-th partial image photographed using the method described with reference to FIG. 5.

In this case, the first partial image to the N-th partial image to be merged are not photographed using the method described with reference to FIG. 5. A method of photographing the first partial image to the N-th partial image may be various. For example, the first partial image to the N-th partial image (e.g., 10-1, 11-1, 12-1, 13-1, 14-1, and 15-1) may be captured by an omni-directional camera including N image sensors disposed toward a first photographing direction to an N-th photographing directions (e.g., 10, 11, 12, 13, 14, and 15). Alternatively, the terminal 200 may be connected to a rotation device, such as a rotatable tripod, and may capture a first partial image to an N-th partial image while rotating the rotation device at intervals of a specific angle. Alternatively, the terminal 200 may be rotated to capture a first partial image to an N-th partial image without a separate rotation device.

The specifying module 120 may specify any one of the first photographing direction to the N-th photographing direction (e.g., 10, 11, 12, 13, 14, and 15) as a target direction.

In an exemplary embodiment, the target direction may be designated by a user.

In another exemplary embodiment, the target direction may have been previously designated. For example, the target direction may have been previously designated as an initial photographing direction (i.e., a first photographing direction).

In another exemplary embodiment, the specifying module 120 may determine a photographing direction, corresponding to a partial image that belongs to a first partial image to an N-th partial image (e.g., 10-1, 11-1, 12-1, 13-1, 14-1, and 15-1) and that is obtained by photographing a predetermined specific target object, as the target direction.

For example, the specific target object may be a person. The specifying module 120 may perform image analysis on each of the first partial image to the N-th partial image (e.g., 10-1, 11-1, 12-1, 13-1, 14-1, and 15-1) and specify a partial image including a specific target object (e.g., person).

Thereafter, the specifying module 120 may determine a photographing direction, corresponding to the partial image including the specific target object (e.g., person), as a target direction. For example, if a specific target object (e.g., person) has been photographed in the second partial image 11-1 of FIG. 3, the specifying module 120 may determine the second photographing direction 11 as a target direction.

In another exemplary embodiment, the specifying module 120 may determine a target direction by comparing pairs of partial images photographed in the same photographing direction with a time lag. This is described with reference to FIGS. 6A and 6B.

Figure 6A:
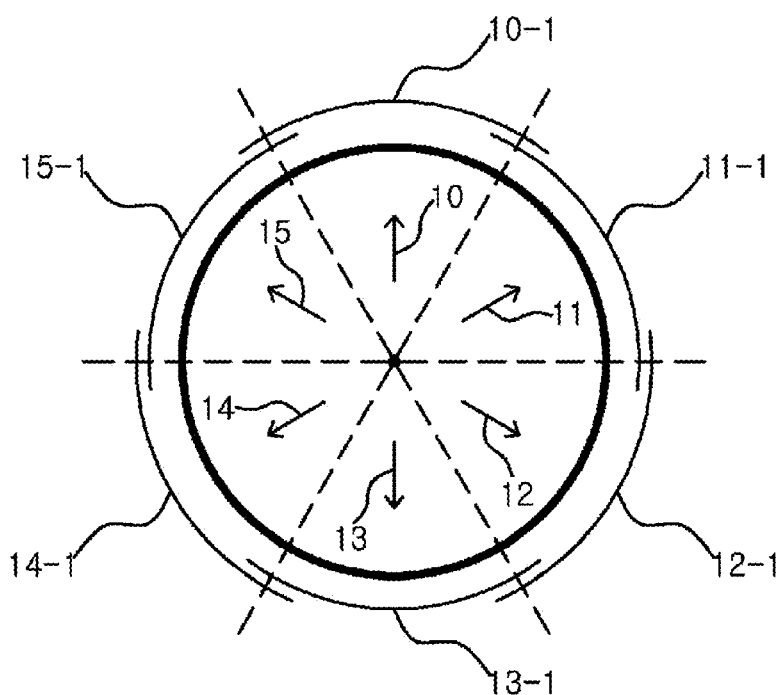
FIG. 6A shows six partial images first photographed in six different photographing directions.
Figure 6B:
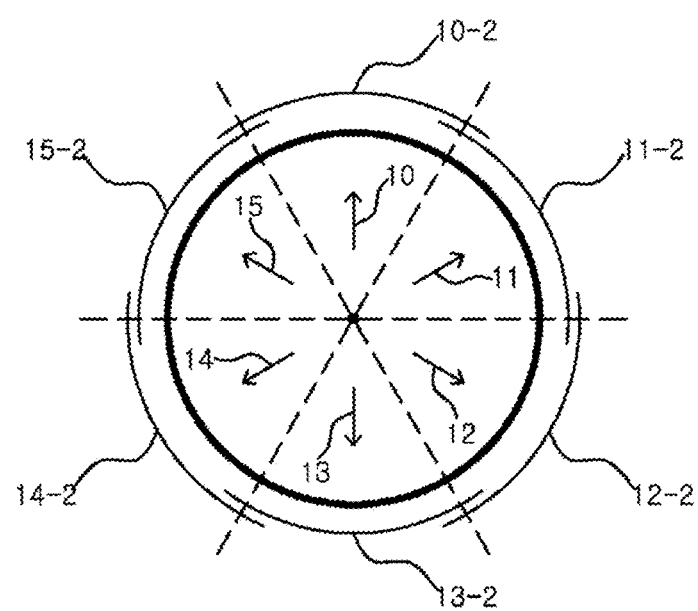
FIG. 6B shows six additional partial images additionally photographed after the partial images of FIG. 6A are photographed.

FIG. 6A shows six partial images first photographed in six different photographing directions. FIG. 6B shows six additional partial images additionally photographed after the partial images of FIG. 6A are photographed.

As shown in FIG. 6A, a first partial image to a sixth partial image 10-1, 11-1, 12-1, 13-1, 14-1, and 15-1 are images photographed in a first photographing direction to a sixth photographing direction 10, 11, 12, 13, 14, and 15, respectively. As shown in FIG. 6B, a first additional partial image to a sixth additional partial image 10-2, 11-2, 12-2, 13-2, 14-2, and 15-2 are images photographed in the first photographing direction to the sixth photographing direction 10, 11, 12, 13, 14, and 15, respectively. That is, both the i-th partial image (i is any natural number, wherein 1<=i<=N) and the i-th additional partial image are images photographed toward the i-th photographing direction.

The first additional partial image to the N-th additional partial image (e.g., 10-2, 11-2, 12-2, 13-2, 14-2, and 15-2) may also be photographed by the terminal 200 and driving device 210 of FIG. 4 using the same method as that of FIG. 5.

The first additional partial image to the N-th additional partial image may be images photographed after the respective partial images are photographed. For example, the terminal 200 may first capture a first partial image to an N-th partial image (e.g., 10-1, 11-1, 12-1, 13-1, 14-1, and 15-1) while rotating 360°, and may then capture a first additional partial image to an N-th additional partial image (e.g., 10-2, 11-2, 12-2, 13-2, 14-2, and 15-2) while rotating 360°.

Alternatively, the terminal 200 may capture a first partial image (e.g., 10-1) toward a first photographing direction (e.g., 10), may capture a first additional partial image (e.g., 10-2) after a lapse of a given time, may rotate in a second photographing direction (e.g., 11) and capture a second partial image (e.g., 11-1), and may then capture a second additional partial image (e.g., 11-2) after a lapse of a given time. Likewise, the terminal 200 may capture an N-th partial image and an N-th additional partial image.

The image acquisition module 110 may further obtain a first additional partial image to an N-th additional partial image (e.g., 10-2, 11-2, 12-2, 13-2, 14-2, and 15-2) additionally photographed in a first photographing direction to an N-th photographing direction (e.g., 10, 11, 12, 13, 14, and 15), respectively, in addition to a first partial image to an N-th partial image (e.g., 10-1, 11-1, 12-1, 13-1, 14-1, and 15-1).

Accordingly, the specifying module 120 may specify a target direction of the first direction to the N-th direction by comparing the first partial image to the N-th partial image with the respective additional partial images.

In an exemplary embodiment, the specifying module 120 may calculate a difference between each partial image and each additional partial image corresponding to the corresponding partial image, and may determine a photographing direction in which a partial image having the greatest difference and an additional image corresponding to the partial image are photographed as a target direction.

For example, the specifying module 120 may calculate a difference between the first partial image 10-1 and the first additional partial image 10-2, a difference between the second partial image 11-1 and the second additional partial image 11-2, . . . , a difference between the sixth partial image 15-1 and the sixth additional partial image 15-2. If the difference between the second partial image 11-1 and the second additional partial image 11-2 is the greatest, the specifying module 120 may determine the second photographing direction 11 as a target direction.

Referring back to FIG. 2, the advertising image generation module 130 may generate an advertising image, corresponding to each of target replacement images, by modifying the target replacement image, that is, at least some of the first partial image to the N-th partial image.

In an exemplary embodiment, the target replacement image may be a left-neighboring image and/or a right-neighboring image.

The left-neighboring image may be a partial image neighboring the left side of a partial image that belongs to the first partial image to the N-th partial image and that has been photographed toward the target direction. The right-neighboring image may be a partial image neighboring the right side of a partial image that belongs to the first partial image to the N-th partial image and that has been photographed toward the target direction.

Assuming that a first partial image to an N-th partial image are the same as those shown in FIG. 3 and the specifying module 120 has specified the second photographing direction 11 as a target direction, examples of a left-neighboring image and a right-neighboring image are described below.

In the above example, the image 10-1 photographed toward the first photographing direction 10, that is, a partial image neighboring the left side of the partial image 11-1 photographed toward the target direction (i.e., the second photographing direction 11), may be referred to as a left-neighboring image. The image 12-1 photographed toward the third photographing direction 12, that is, a partial image neighboring the right side of the partial image 11-1 photographed toward the target direction (i.e., the second photographing direction 11), may be referred to as a right-neighboring image.

As described above, in some exemplary embodiments, a target replacement image may be a left-neighboring image or a right-neighboring image or may be both a left-neighboring image and a right-neighboring image.

In an exemplary embodiment, the advertising image generation module 130 may detect a given advertisement target object in the target replacement image, and may replace the detected target advertising object with a given advertising object corresponding to the target advertising object.

In another exemplary embodiment, the advertising image generation module 130 may replace some region of the target replacement image with a given advertising image.

In an exemplary embodiment, the advertising image generation module 130 may replace the entire region of the target replacement image with a given advertising image.

Also, the advertising image generation module 130 may replace the entire region of the target replacement image with a given advertising image. In this case, the advertising image generation module 130 may detect a region e.g., wall surface) having relatively low importance in the target replacement image, and may insert an advertising image into the detected region.

More specifically, the advertising image generation module 130 may detect a given non-importance region in the target replacement image and insert the advertising image into the detected non-importance region. In this case, the non-importance region is a region of a given size or more. A color difference or distance between each of pixels within the non-importance region and all other pixels within the non-importance region may be with a certain value.

A color difference between two pixels may be the Euclidean Distance in the color space where a pixel is represented. For example, if a pixel is represented as <R, G, B>, color difference distance between two pixels P1=<R1, G1, B1> and P2=<R2, G2, B2> may be calculated by the following equation.

$$\text{distance} = \sqrt{(R_2-R_1)^2 + (G_2-G_1)^2 + (B_2-B_1)^2}$$

In accordance with the present embodiment, the advertising image generation module 130 may insert an advertising image into a non-importance region, such as a wall surface in which a color difference between pixels within a corresponding region is not great.

The 360° image generation module 140 may generate a 360° image (e.g., spherical image) by merging advertising images, corresponding to the respective target replacement images, with the remaining partial images except the target replacement image among the obtained first partial image to N-th partial image.

Figure 7:
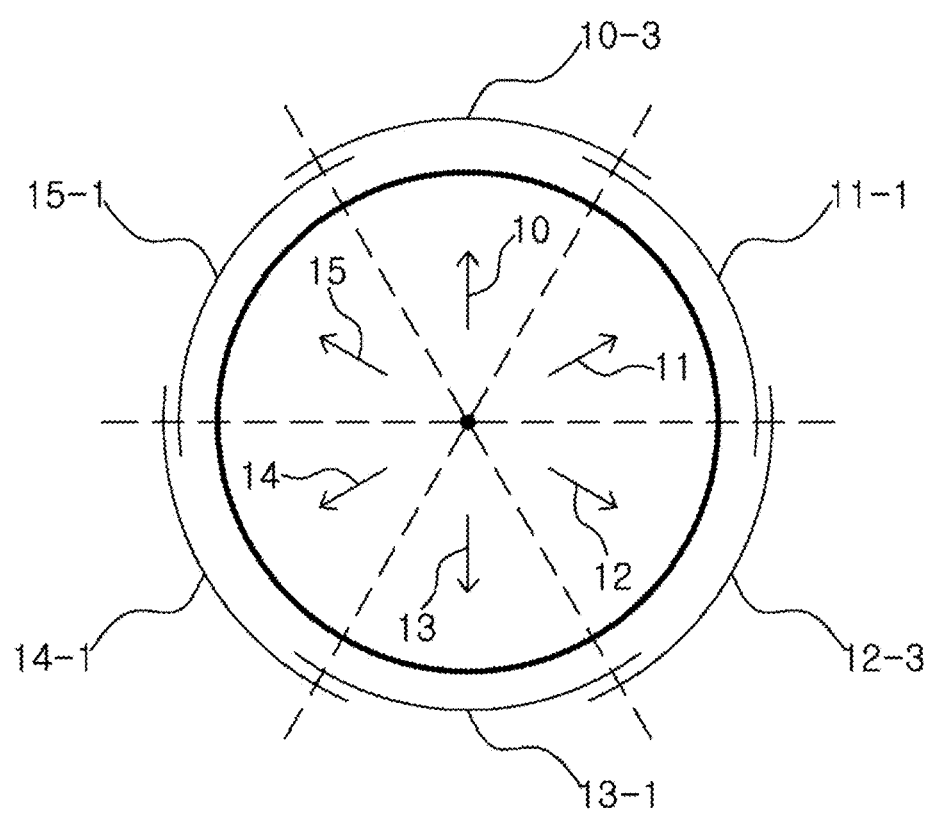
FIG. 7 illustrates images merged to generate a 360° image according to an exemplary embodiment.

FIG. 7 is a diagram for illustrating images merged by the 360° image generation module 140 in order to generate a 360° image.

FIG. 7 shows an example in which a target direction is a second photographing direction 11 and target replacement images are the left-neighboring image and the right-neighboring image. That is, in the example of FIG. 7, it is assumed that the advertising image generation module 130 generates advertising images corresponds to the left-neighboring image (i.e., first partial image 10-1) and the right-neighboring image (i.e., a third part image 12-1), respectively, by substituting the left-neighboring image and the right-neighboring image.

Referring to FIG. 7, the 360° image generation module 140 may merge advertising images 10-3 and 12-3 respectively corresponding to the first partial image 10-1 and the third partial image 12-1, that is, the target replacement images, with the remaining partial images (i.e., a second partial image 11-1, a fourth partial image 13-1, a fifth partial image 14-1 and a sixth partial image 15-1) except the target replacement images (i.e., the first partial image 10-1 and the third partial image 12-1) among the first partial image 10-1 to a sixth partial image 15-1.

The 360° image generation module 140 may generate a 360° image using known various stitching schemes. For example, the 360° image generation module 140 may perform a process of projecting/distorting target merging images (i.e., the remaining partial images except the target replacement images among the first partial image to the N-th partial image and the advertising images respectively corresponding to the target replacement images) to a cylindrical or globular shape coordinate system, extracting a feature point in each target merging image, arranging neighboring target merging images, and blending the neighboring target merging images so that they are smoothly connected.

The video frame acquisition module 150 may obtain a plurality of video frame images photographed toward the target direction.

For example, the video frame acquisition module 150 may obtain the plurality of video frame images from the terminal 200. In this case, the terminal 200 may control the driving device 210 so that the terminal 200 is directed toward the target direction, and may capture the plurality of video frame images.

The video generation module 160 may generate a 360° video based on the plurality of video frame images obtained by the video frame acquisition module 150 and the 360° image generated by the 360° image generation module 140.

More specifically, the video generation module 160 may generate 360° video frames corresponding to video frames by merging the plurality of video frame images to the 360° image. This is described with reference to FIGS. 8 and 9.

Figure 8:
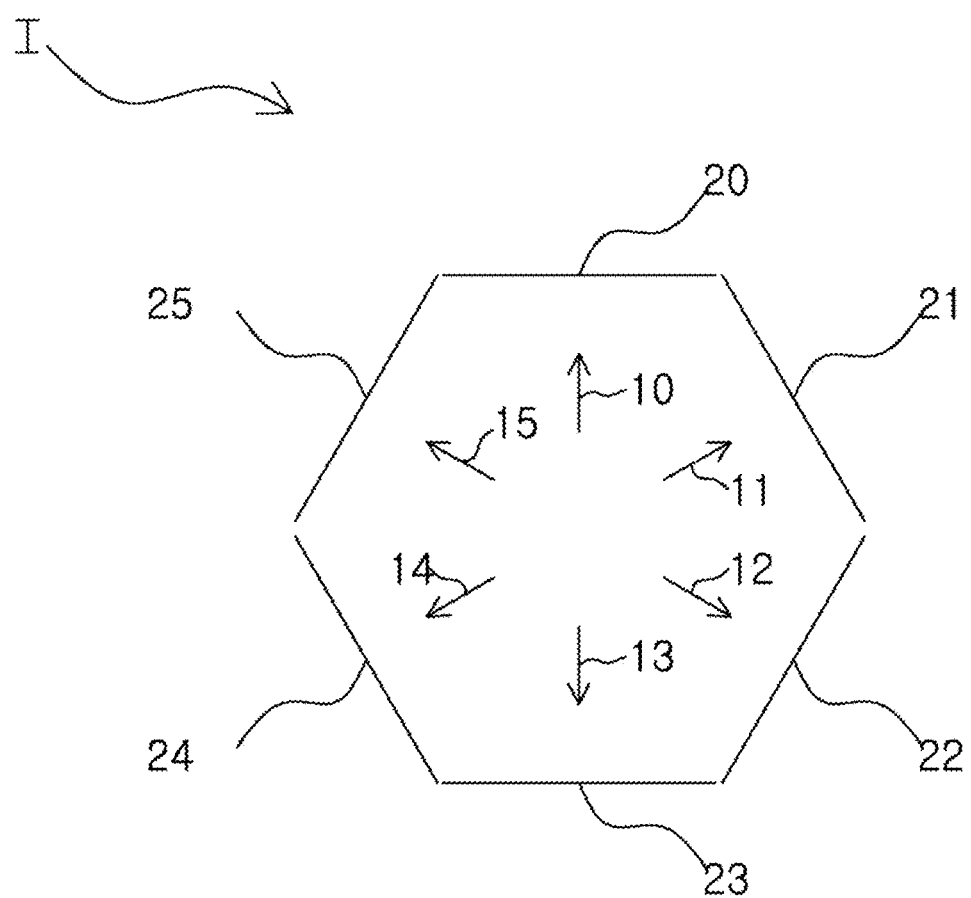
FIG. 8 illustrates a 360° image.
Figure 9:
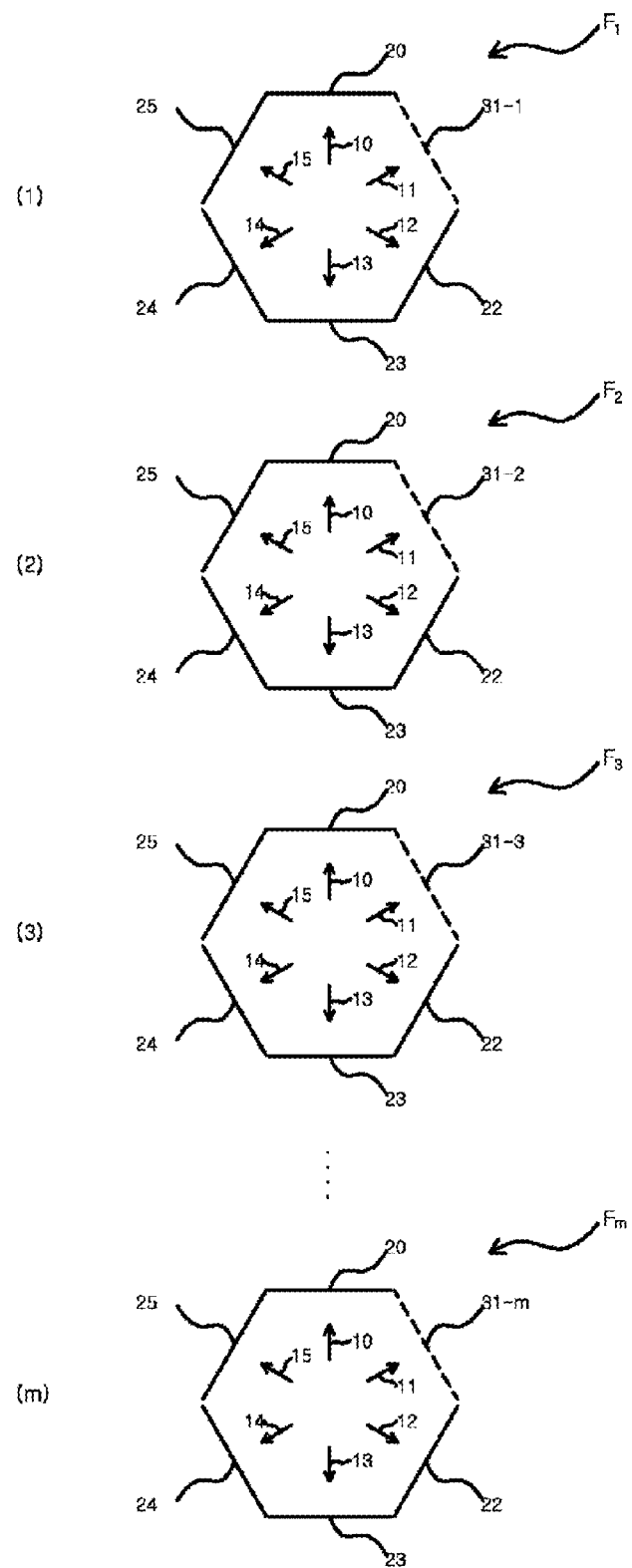
FIG. 9 illustrates 360° video frames forming a 360° video.

FIG. 8 is a diagram showing a 360° image generated by the 360° image generation module 140. FIG. 9 is a diagram showing 360° video frames generated by the video generation module 160.

In the examples of FIGS. 8 and 9, it is assumed that a second photographing direction 11 has been specified as a target direction.

As described above, the 360° image is generated by the merging of the remaining partial images other than the target replacement images among the first partial image to the N-th partial image and advertising images respectively corresponding to the target replacement images. Accordingly, as shown in FIG. 8, a 360° image I may consist of parts 20-1 to 20-5 corresponds to the remaining partial images except the target replacement images among the first partial image to the N-th partial image and advertising images respectively corresponding to the target replacement images.

Assuming that the 360° image of FIG. 8 has been generated by the merging of images, such as those shown in FIG. 7, the first part 20 of the 360° image I may correspond to the advertising image 10-3 generated from the first partial image 10-1, that is, a target replacement image. The second part 21 of the 360° image I may correspond to the second partial image 11-1. The third part 22 of the 360° image I may correspond to the advertising image 12-3 generated from the third partial image 12-1, that is, a target replacement image. The fourth part 23 of the 360° image I may correspond to the fourth partial image 13-1. The fifth part 24 of the 360° image I may correspond to the fifth partial image 14-1. The sixth part 25 of the 360° image I may correspond to the sixth partial image 15-1.

The video generation module 160 may merge each video frame image with the part 21 corresponding to a partial image that belongs to the 360° image I and that is photographed in the target direction 11.

In the example of FIG. 9, the video generation module 160 may generate a first 360° video frame $F_1$ by merging a first video frame image 31-1 with a part corresponding to a partial image that belongs the 360° image I and that is photographed in the target direction 11. Accordingly, the first 360° video frame $F_1$ may consist of a part 20 corresponding to the advertising image 10-3 generated from the first partial image 10-1, that is, a target replacement image, a part 22 corresponding to the advertising image 12-3 generated from the third partial image 12-1, that is, a target replacement image, parts 23, 24, and 25 corresponding to the fourth partial image to the sixth partial image 13-1, 14-1, and 15-1, and the first video frame image 31-1.

Furthermore, the video generation module 160 may generate a second 360° video frame $F_2$ by merging a second video frame image 31-2 with a part corresponding to a partial image that belongs to the 360° image I and that is photographed in the target direction 11. The second 360° video frame $F_2$ may consist of the part 20 corresponding to the advertising image 10-3 generated from the first partial image 10-1, that is, a target replacement image, the part 22 corresponding to the advertising image 12-3 generated from the third partial image 12-1, that is, a target replacement image, the parts 23, 24, and 25 corresponding to the fourth partial image to the sixth partial image 13-1, 14-1, and 15-1, and the second video frame image 31-2.

Likewise, the video generation module 160 may generate up to a 360° video frame $F_m$ corresponding to the last video frame image 31-m. The 360° video frame $F_m$ may consist of the part 20 corresponding to the advertising image 10-3 generated from the first partial image 10-1, that is, a target replacement image, the part 22 corresponding to the advertising image 12-3 generated from the third partial image 12-1, that is, a target replacement image, the parts 23, 24, and 25 corresponding to the fourth partial image to the sixth partial image 13-1, 14-1, and 15-1, and the last video frame image 31-m.

In the examples of FIGS. 8 and 9, the second partial image used to generate the 360° image and the video frame images used to generate the respective 360° video frames may be very similar in the stitching process, various parameters necessary for the stitching process, and middle results derived in the stitching process because all of them have been photographed toward the same direction (i.e., the second photographing direction 11). Accordingly, some of the stitching process may be omitted or the stitching process may be performed by very simple operation. For example, in order to position an image of a plane in a globular shape, the image needs to be distorted. The same distortion conversion as that applied to the second partial image may be identically applied to all the video frame images used to generate the respective 360° video frames.

In a 360° video generated by the video generation module 160 as described above, each of frames forming the 360° video has no change in the remaining regions other than a region corresponding to a partial image photographed in the target direction, but may have a change only in the region corresponding to the partial image photographed in the target direction.

In the case of a common 360° video, a single 360° video frame is generated by merging partial images photographed in the omni-direction. That is, very large resources are necessary because all the partial images photographed in the omni-direction must be always merged in order to generate each 360° video frame. However, according to the inventive concepts, a partial image photographed in a photographing direction other than a target direction is merged only once and fixed on each 360° video frame, and only a part photographed in the target direction is newly merged. Accordingly, there is an advantage in that resources are required much less.

Furthermore, the inventive concepts have an effect in that a 360° video generated by the video generation module 160 can be used as an advertising channel because the 360° video includes advertising content. In particular, an advertising effect can be maximized if a part including advertising content is the left-neighboring image and/or right-neighboring image of a target direction. The reason for this is that in a 360° video generated by the system and method according to the inventive concepts, a viewer basically rivets his or her eyes to a target direction because only a part photographed in the target direction continues to be change and advertising content is positioned near the region on which the viewer's eyes are concentrated.

Figure 10:
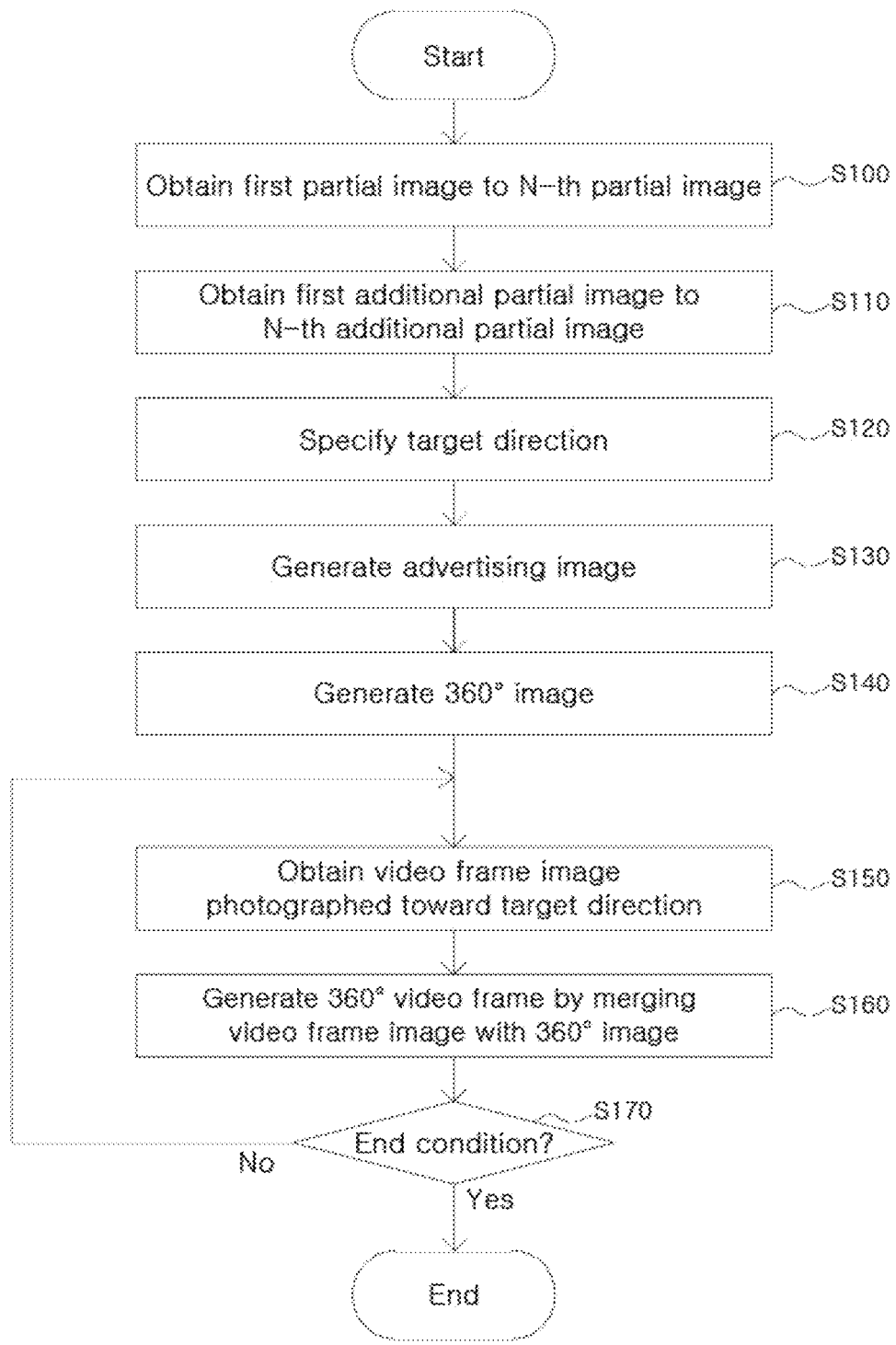
FIG. 10 is a flowchart showing a method of generating a 360° video according to an exemplary embodiment.

FIG. 10 is a flowchart showing a method of generating a 360° video according to an exemplary embodiment.

Referring to FIG. 10, the 360° video generation system 100 may obtain a first partial image to an N-th partial image (N is an integer of 2 or more) (S100). In this case, the i-th partial image (i is any natural number, wherein 1<=i<=N) is an image photographed toward the i-th photographing direction corresponding to the i-th partial image at a given photographing location. All the first photographing direction to the N-th photographing direction are different directions.

In some exemplary embodiments, the 360° video generation system 100 may further obtain a first additional partial image to an N-th additional partial image (S110). In this case, the i-th additional partial image (i is any natural number, wherein 1<=i<=N) is an image photographed toward the i-th photographing direction at the photographing location.

The 360° video generation system 100 may specify a target direction, that is, any one of the first photographing direction to the N-th photographing direction (S120). In an exemplary embodiment, the 360° video generation system 100 may compare each of the first partial image to the N-th partial image with each additional partial image corresponding to the corresponding partial image, and may determine a photographing direction, corresponding to a partial image having the greatest difference, as the target direction.

The 360° video generation system 100 may generate advertising images corresponding to target replacement images, respectively, by modifying the target replacement images, that is, at least some of the first partial image to the N-th partial image (S130).

In an exemplary embodiment, the target replacement image may include at least one of a left-neighboring image and a right-neighboring image. In this case, the left-neighboring image may be a partial image neighboring the left side of a partial image that belongs to the first partial image to the N-th partial image and that has been photographed toward the target direction. The right-neighboring image may be a partial image neighboring the right side of a partial image that belongs to the first partial image to the N-th partial image and that has been photographed toward the target direction.

Thereafter, the 360° video generation system 100 may generate a 360° image by merging advertising images corresponding to the respective target replacement images with the remaining partial images except the target replacement images among the first partial image to the N-th partial image (S140).

Furthermore, the 360° video generation system 100 may obtain a video frame image photographed toward the target direction (S150), and may generate a 360° video frame by merging the obtained video frame image with the 360° image (S160).

Meanwhile, the 360° video generation system 100 may generate a 360° video frame until a given end condition (e.g., the generation of a complete signal) is satisfied (S170).

In some implementation examples, the 360° video generation system 100 may include a processor and memory for storing a program executed by the processor. The processor may include a single core CPU or a multi-core CPU. The memory may include high-speed random access memory, and may include one or more magnetic disk storage devices, flash memory devices or other non-volatile memory, such as non-volatile solid state memory devices. The access of the processor and other elements to the memory may be controlled by a memory controller. In this case, the program may enable the 360° video generation system 100 according to the present embodiment to perform the above-described method of generating a 360° video when the program is executed by the processor.

In accordance with the inventive concepts, the system and method capable of generating a 360° video using relatively small resources can be provided.

In the case of a common 360° video, one 360° video frame is generated by merging partial images photographed in the omni-direction. That is, very large resources are necessary because all the partial images photographed in the omni-direction must be always merged in order to generate each 360° video frame. In contrast, the inventive concepts have an advantage in that resources are required much less because a partial image photographed in a photographing direction other than a target direction is merged only once and fixed on each 360° video frame, and only a part photographed in the target direction is newly merged.

An exemplary embodiment has an effect in that a 360° video can be generated conveniently and relatively accurately using a terminal carried by a user.

Furthermore, the inventive concepts have an effect in that a 360° video generated by the system and method according to the exemplary embodiments can be used as an advertising channel because the 360° video includes advertising content. In particular, an advertising effect can be maximized if a part including advertising content is the left-neighboring image and/or right-neighboring image of a target direction. The reason for this is that in a 360° video generated by the system and method according to the inventive concepts, a viewer basically rivets his or her eyes to a target direction because only a part photographed in the target direction continues to be change and advertising content is positioned near the region on which the viewer's eyes are concentrated.

The method of generating a 360° video according to the exemplary embodiments may be implemented in the form of computer-readable program instructions and stored in a computer-readable recording medium. The computer-readable recording medium includes all types of recording devices in which data readable by a computer system is stored.

The program instructions recorded on the recording medium may have been specially designed or configured for the present invention or may have been known to and available by a person skilled in the software field.

Examples of the computer-readable recording medium include hardware devices specially configured to store and execute program instructions, such as magnetic media such as a hard disk, a floppy disk and a magnetic disk, optical media such as CD-ROM and a DVD, magneto-optical media such as a floptical disk, ROM, RAM, and flash memory. Furthermore, the above-described medium may be a transmission medium, such as light including carriers that transmit a signal to designate a program instruction or a data structure, a metal line or a waveguide. Furthermore, the computer-readable medium may be distributed to computer systems connected over a network, and computer-readable code may be stored and executed in a distributed manner.

An example of the program instructions includes a high-level language code executable by a device for electronically processing information using an interpreter, for example, a computer, in addition to a machine code, such as that produced by a compiler.

The above-described hardware device may be configured to operate as one or more software modules in order to perform an operation and vice versa.

The above-described description is illustrative, and those skilled in the art to which the present invention pertains will appreciate that the present invention may be implemented in other detailed forms without departing from the inventive concepts or essential characteristics.

Accordingly, the above-described embodiments should be construed as being only illustrative not as being restrictive from all aspects. For example, each of the elements described in the singular forms may be distributed and implemented. Likewise, elements described in a distributed way may also be combined and implemented.

The scope is defined by the appended claims rather than the detailed description, and the present invention should be construed as covering all modifications or variations derived from the meaning and scope of the appended claims and their equivalents.

In exemplary embodiments, the 360° video generation system 100 including the image acquisition module 110, the specifying module 120, the advertising image generation module 130, the 360° image generation module 140, the video frame acquisition module 150 and the video generation module 160, and the terminal 200, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the 360° video generation system 100 including the image acquisition module 110, the specifying module 120, the advertising image generation module 130, the 360° image generation module 140, the video frame acquisition module 150 and the video generation module 160, and the terminal 200, and/or one or more components thereof may include or otherwise be associated with one or more memories including code (e.g., instructions) configured to cause the 360° video generation system 100 including the image acquisition module 110, the specifying module 120, the advertising image generation module 130, the 360° image generation module 140, the video frame acquisition module 150 and the video generation module 160, and the terminal 200, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of generating a 360° video, the method comprising:
    obtaining, by a 360° video generation system, partial images comprising a first partial image to an N-th partial image (N is an integer of 2 or more) by photographing toward a first photographing direction to an N-th photographing direction, respectively, at a given photographing location, wherein each of the first photographing direction to the N-th photographing direction are directions different from each other;
    generating, by the 360° video generation system, advertising images respectively corresponding to target replacement images by modifying the target replacement images, the target replacement images comprising at least some of the first partial image to the N-th partial image;
    generating, by the 360° video generation system, a 360° image by merging the advertising images respectively corresponding to the target replacement images with the partial images other than the target replacement images among the first partial image to the N-th partial image;
    obtaining, by the 360° video generation system, a plurality of video frame images photographed toward a target direction being one of the first photographing direction to N-th photographing direction; and
    generating, by the 360° video generation system, a 360° video based on the plurality of video frame images and the 360° image.

2. The method of claim 1, wherein the target replacement image comprises at least one of a left-neighboring image and a right-neighboring image,
    wherein the left-neighboring image is a partial image neighboring a left side of a partial image which has been photographed toward the target direction, and
    wherein the right-neighboring image is a partial image neighboring a right side of a partial image which has been photographed toward the target direction.

3. The method of claim 1, wherein the generating of the advertising images comprises:
    detecting, by the 360° video generation system, a target object in the target replacement image; and
    replacing, by the 360° video generation system, the detected target object with a given advertising object corresponding to the detected target object.

4. The method of claim 1, wherein the generating of the advertising images comprises:
    replacing, by the 360° video generation system, some region of the target replacement image with a given advertising image.

5. The method of claim 4, wherein the replacing of the some region of the target replacement image with a given advertising image comprises:
    detecting, by the 360° video generation system, a given non-importance region within the target replacement image, the non-importance region being a region having:
        a size equal to or greater than a given size; and
        a color difference between each of pixels within the non-importance region within a certain value; and
    inserting, by the 360° video generation system, the advertising image into the non-importance region within the target replacement image.

6. The method of claim 1, wherein the obtaining of the first partial image to the N-th partial image comprises:
    obtaining, by the 360° video generation system, the first partial image to the N-th partial image captured by a terminal equipped with an image sensor,
    wherein the terminal is configured to obtain the first partial image by capturing the first partial image toward the first photographing direction at the photographing location, and sequentially rotate and capture the second partial image to the N-th partial image by controlling a driving device combined with the terminal to rotate the terminal,
    wherein the terminal is configured to control the driving device to rotate the terminal directed toward a (j−1)-th photographing direction and direct the terminal toward a j-th photographing direction after capturing a (j−1)-th partial image, and obtain a j-th partial image by capturing the j-th partial image toward the j-th photographing direction, and
    wherein j is a natural number, where $2<=j<=N$.

7. The method of claim 1, wherein the obtaining of the first partial image to the N-th partial image comprises:
    obtaining, by the 360° video generation system, the first partial image to the N-th partial image captured by a terminal equipped with an image sensor,
    wherein the method further comprises:
        obtaining, by the 360° video generation system, additional partial images comprising a first additional partial image to an N-th additional partial image additionally captured by the terminal photographed toward the first photographing direction to the N-th photographing direction, respectively, at the photographing location; and
        specifying, by the 360° video generation system, the target direction by comparing each of the partial images with corresponding additional partial images.

8. The method of claim 1, further comprising:
    determining a target direction, the target direction being a photographing direction, corresponding to a partial image obtained by photographing a predetermined specific object.

9. A non-transitory computer-readable storage medium having stored thereon processor-executable instruction configured to cause a processor to perform the method of claim 1.

10. A 360° video generation system, comprising:
    a processor; and
    memory configured to store a computer program executed by the processor,
    wherein the computer program comprises instructions, when executed by the processor, configured to cause the 360° video generation system to perform the method according to claim 1.

11. A 360° video generation system, comprising:
    an image acquisition module configured to obtain partial images comprising a first partial image to an N-th partial image (N is an integer of 2 or more) by photographing toward a first photographing direction to an N-th photographing direction, respectively, at a given photographing location, wherein each of the first photographing direction to the N-th photographing direction are directions different from each other;

an advertising image generation module configured to generate advertising images respectively corresponding to target replacement images by modifying the target replacement images, the target replacement images comprising at least some of the first partial image to the N-th partial image;

a 360° image generation module configured to generate a 360° image by merging the advertising images respectively corresponding to the target replacement images with the partial images other than the target replacement images among the first partial image to the N-th partial image;

a video frame acquisition module configured to obtain a plurality of video frame images photographed toward a target direction being one of the first photographing direction to N-th photographing direction; and a video generation module configured to generate a 360° video based on the plurality of video frame images and the 360° image.

12. The 360° video generation system of claim 11, wherein the target replacement image comprises at least one of a left-neighboring image and a right-neighboring image, wherein the left-neighboring image is a partial image neighboring a left side of a partial image which has been photographed toward the target direction, and wherein the right-neighboring image is a partial image neighboring a right side of a partial image which has been photographed toward the target direction.

13. The 360° video generation system of claim 11, wherein the advertising image generation module is configured to:

detect a target object in the target replacement image; and replace the detected target object with a given advertising object corresponding to the detected target object.

14. The 360° video generation system of claim 11, wherein the advertising image generation module is configured to replace some region of the target replacement image with a given advertising image.

15. The 360° video generation system of claim 11, wherein the advertising image generation module is configured to:

detect a given non-importance region within the target replacement image, the non-importance region being a region having a size equal to or greater than a given size; and a color difference between each of pixels within the non-importance region within a certain value; and insert the advertising image into the non-importance region within the target replacement image.

16. The 360° video generation system of claim 11, wherein the image acquisition module is configured to obtain the first partial image to the N-th partial image captured by a terminal equipped with an image sensor, wherein the terminal is configured to obtain the first partial image by capturing the first partial image toward the first photographing direction at the photographing location, and sequentially rotate and capture the second partial image to the N-th partial image by controlling a driving device combined with the terminal to rotate the terminal, wherein the terminal is configured to control the driving device to rotate the terminal directed toward a (j−1)-th photographing direction and direct the terminal toward a j-th photographing direction after capturing a (j−1)-th partial image, and obtains a j-th partial image by capturing the j-th partial image toward the j-th photographing direction, and wherein j is a natural number, where $2<=j<=N$.

17. The 360° video generation system of claim 11, wherein the image acquisition module is configured to:

obtain the first partial image to the N-th partial image captured by a terminal equipped with an image sensor; and further obtain additional partial images comprising a first additional partial image to an N-th additional partial image additionally captured by the terminal photographed toward the first photographing direction to the N-th photographing direction, respectively, at the photographing location, and the 360° video generation system further comprises a specifying module configured to specify the target direction by comparing each of the partial images with corresponding additional partial images.

18. The 360° video generation system of claim 11, further comprising a specifying module configured to determine a target direction, the target direction being a photographing direction, corresponding to a partial image obtained by photographing a predetermined specific object.

* * * * *